Aug. 12, 1947.  J. F. CARTER  2,425,596
MILK COOLER
Filed June 14, 1944
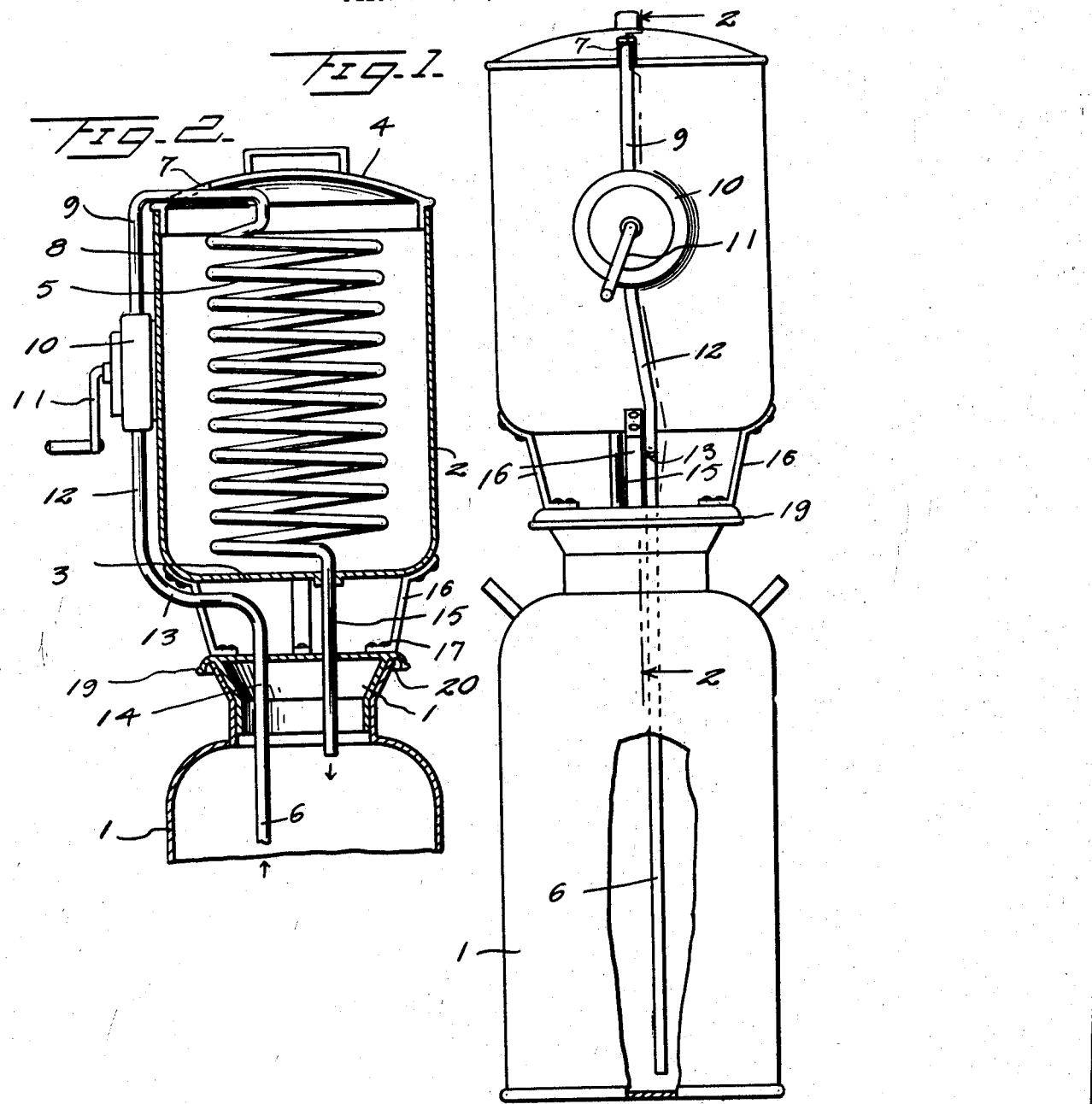
Inventor
J. F. Carter
By L. F. Randolph
Attorney Patented Aug. 12, 1947

2,425,596

UNITED STATES PATENT OFFICE 2,425,596

MILK COOLER

James Franklin Carter, Alice, Tex.

Application June 14, 1944, Serial No. 540,187

2 Claims. (Cl. 257—215)

This invention relates to a milk-cooling device and has for its object to provide means whereby milk, in an ordinary milk can, may be very rapidly cooled.

An object of the invention is to provide a cooling device adapted to be attached to the mouth of a milk can and the milk passed through said device to cool the same.

A further object of the invention is to provide a cooler of simple construction capable of being supported by a container closure and including cooling means, conduit means through which a liquid in a container, on which this closure is mounted, can be conveyed into proximity to the cooling means to be cooled thereby, and impelling means for forcing the liquid through the conduit means.

With the above and such other objects in view as may hereinafter be disclosed in the following specification I have invented the device illustrated in the accompanying drawing in which:

Figure 1 is an elevational view of my invention shown attached to a common milk can, and Figure 2 is a vertical sectional view of my device, the lower portion of the milk can being shown broken away.

Like reference characters indicate like parts in both the following specification and the accompanying drawing, and in which 1 indicates a common milk can upon which is attached my cooling device 2. The device 2 is preferably in the form of a can approximating the size of the milk can, however, it may be larger or smaller as required. The can 2 is provided with a bottom wall 3 and a lid 4 and mounted within said can is a copper coil 5, one leg of which projects upwardly through an aperture 7 in said lid and extends across to slightly beyond the wall 8 of the can, and is turned down as at 9. A pump 10 operated by a crank 11, is interposed in the downturned portion of the leg, designated 12. Leg 12 continues down and is curved inwardly at 13, under the can 2, and then bent vertically as at 14, and then extends down to near the bottom of the can 1, as seen at 6. The other leg 15 of the coil extends through an aperture formed in the bottom wall 3, of the can 2, and projects down a short distance into the can 1. The can 2 is mounted upon legs 16, the lower ends 17 of which are fixed to a closure 19 of the can 1.

Assuming that the can 1 is filled with milk or other liquid and that the closure 19 is in place, with the cooling apparatus supported thereby, and with the container 2 filled with ice or other suitable refrigerant; by rotating crank 11 pump 10 will be operated to draw the milk into pipe end 6. The milk will be forced up through leg 12 and thence through coils 5 by which it is conducted by a circuitous route through the cooling medium to be cooled thereby before being discharged through leg 15 back into the can 1.

Having now described my invention, that which I claim to be new and desire to protect by Letters Patent is:

1. In a cooling apparatus, a refrigerant containing receptacle, a liquid container closure on which the receptacle is mounted for supporting it thereabove, a conduit having ends projecting from the inner side of the closure and positioned thereby for submersion in the liquid contents of a container, on which the closure is mounted, said conduit having a coiled portion disposed in the receptacle and a leg disposed on the exterior thereof, and manually operated transfer means interposed in said leg for circulating a liquid, into which the ends of the conduit extend, through said conduit.

2. In a cooling apparatus, a container for a liquid provided with a closure, a receptacle fixedly mounted on the outer side of said closure and containing a refrigerant, a conduit including a coiled portion disposed in the receptacle and having end portions extending through said closure and fixed thereby within the container, when the closure is applied, said conduit having a leg portion disposed exteriorly of the receptacle, and a manually operated pump interposed in said leg portions for pumping the liquid contents of the container through said conduit.

JAMES FRANKLIN CARTER.

REFERENCES CITED

The following references are of record in the file of this patent:

UNITED STATES PATENTS

| Number | Name | Date |
|---|---|---|
| 1,716,945 | Beede | June 11, 1929 |
| 1,838,610 | Bodes | Dec. 29, 1931 |
| 2,217,379 | Peardon | Oct. 8, 1940 |
| 1,852,219 | Sahnow et al. | Apr. 5, 1932 |
| 986,276 | Freeman | Mar. 7, 1911 |

FOREIGN PATENTS

| Number | Country | Date |
|---|---|---|
| 356,636 | Great Britain | Sept. 10, 1931 |